United States Patent

[11] 3,563,556

[72] Inventor  Arthur M. Scott
              Twin Falls, Idaho
[21] Appl. No. 846,204
[22] Filed     July 30, 1969
[45] Patented  Feb. 16, 1971
[73] Assignee  Federal-Mogul Corporation
               Southfield, Mich.

[54] BOOT-TYPE SHAFT SEAL UNIT
     9 Claims, 7 Drawing Figs.
[52] U.S. Cl. .................................... 277/65,
                              277/90, 277/153, 277/181
[51] Int. Cl. .................................... F16j 15/38
[50] Field of Search .......................... 277/65, 90,
                      153, 181, 182, 183, 184, 185, 186; 64/32

[56]           References Cited
           UNITED STATES PATENTS
2,203,163  6/1940  Leonard ..................... 277/184
2,983,125  5/1961  Peickii et al. ............... 277/65
3,241,845  3/1966  Smith et al. ................ 277/182

Primary Examiner—Laverne D. Geiger
Assistant Examiner—Robert I. Smith
Attorney—Owen, Wickersham and Erickson ABSTRACT: An annular metal case supports a shaft-engaging elastomeric sealing member and has a pair of radially spaced apart cylindrical walls providing a bore-fitting surface and an annular recess between the walls. A separable elastomeric boot has an end portion anchored in the recess, an axially collapsible sleeve portion, and an outer end portion providing a ring in light reciprocating and rotary contact with the shaft.

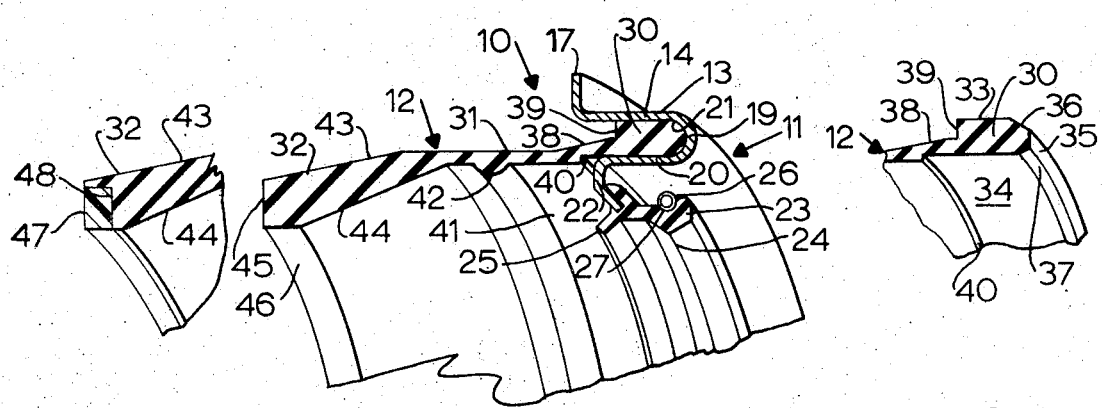
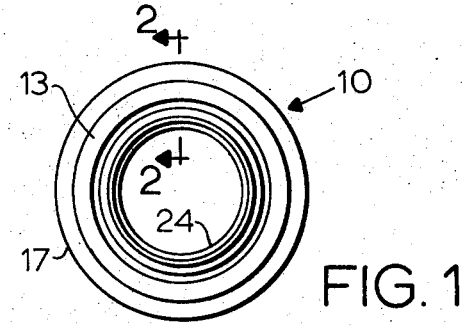
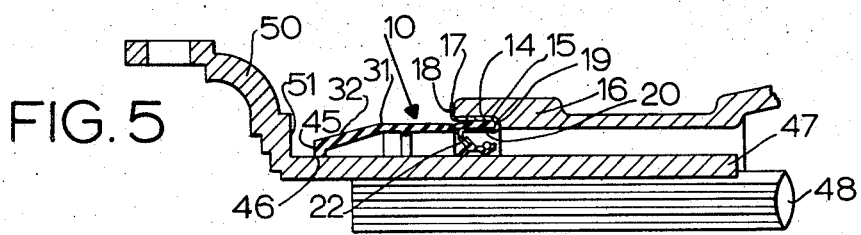
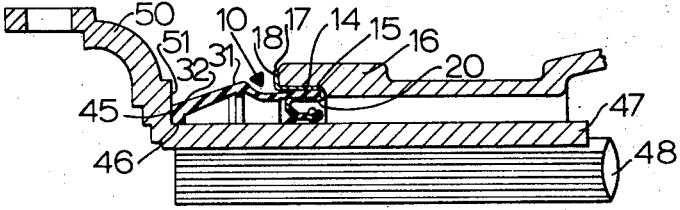
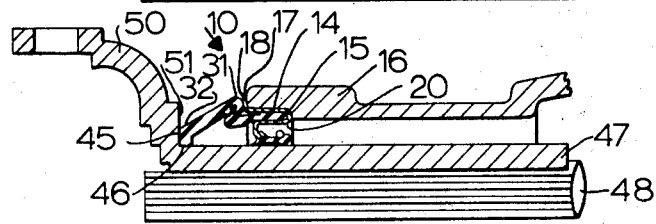
INVENTOR.
ARTHUR M. SCOTT

BOOT-TYPE SHAFT SEAL UNIT

This invention relates to an improved fluid seal adapted to seal between a stationary bore and a rotating shaft. It relates particularly to environments where the shaft is subject to relatively large reciprocatory action.

A very important application of the invention is in the rear transmission of automotive vehicles. The fluid seal at the rear transmission is subject to wear resulting from reciprocation of the drive shaft, caused by the chucking action of the rear wheels of the vehicle. As the shaft moves out, it is exposed to moisture, dirt, oil, etc., and then when it moves back in and then back and forth through the seal, it carries abrasive particles with it. Also, the shaft tends to corrode, and any seal operating on a corroded shaft wears out in short order.

The general problem was solved by U.S. Pat 2,983,125, which provided, in addition to the radial shaft seal, an elongated bootlike collapsible sleeve supported by the seal assembly and enclosing a substantial portion of the shaft. When the universal joint moved against it, the sleeve folded and rolled over itself. Thus, the shaft was not exposed to the corrosive and abrasive elements and could not be exposed to them so long as the sleeve was longer than the reciprocatory action of the shaft.

The present invention is an improvement over U.S. Pat. 2,983,125, in that it provides an equally effective and much less expensive device. The seal of the U.S. Pat. No. 2,983,125 is an assembly comprising two metal cases that have to be joined together; an inner one of the cases had to be formed in a shotgunlike manner to provide a suitable anchor portion to which the other or outer case is clamped. The boot portion is bonded to the outer metal part, and the elastomeric sealing member is bonded to the inner part. The structure is very satisfactory; its only defect is its expense.

The present invention provides a structure in which there is only one metal member. The bootlike sleeve is frictionally held in an annular recess of this metal member, so that it is actually separable from it. It is made of a single molding of elastomer without a metal member; when assembled to lock in the recess with an anchor portion, it is held very well and will not unintentionally come apart, yet there is no need for the relatively expensive metal-bonding and forming operations heretofore required. The single metal case supports the elastomeric seal, which may be bonded to it; in that respect, the elastomeric seal may be molded in a mold which encloses the inner portion only of the case; therefore, the same mold may be as is used to make other seals for shafts of the same size.

Other objects and advantages of the invention will appear from the following description of some preferred embodiments.

In the drawings:

FIG. 1 is a view in end elevation of a fluid seal assembly embodying the principles of the invention.

FIG. 2 is an enlarged fragmentary view in section taken along the line 2—2 in FIG. 1.

FIG. 3 is a fragmentary view in section of the end anchor portion of the bootlike sleeve of FIG. 2 before its assembly to the metal case.

FIG. 4 is a fragmentary view in section of the opposite end of the bootlike sleeve, showing a modified form of construction in which the integral bootlike sleeve of FIG. 2 is replaced by a unit having a rigid ring adhered to the bootlike sleeve.

FIG. 5 is a view in elevation and in section on a scale intermediate to those of FIGS. 1 and 2 of a portion of an installation incorporating the seal of FIG. 1, the bootlike sleeve being shown in its extended position.

FIG. 6 is a view like FIG. 3, showing the sleeve partially collapsed.

FIG. 7 is a view like FIG. 5, showing the sleeve fully collapsed.

As shown in the drawings, the seal assembly 10 comprises two basic set assemblies, a fluid seal unit 11 and a bootlike member 12.

The seal unit 11 (FIGS. 1 and 2) preferably comprises a metal case 13 having an outer cylindrical portion 14, which is able to engage in the bore 15 of a housing 16. Radially outside beyond this, a radial flange 17 is preferably connected to the cylindrical portion 14 and is adapted for engagement with the end wall 18 of the housing 16. A radially extending portion 19 which may be of a circular arc (as seen in section) connects the outer cylindrical portion 14 to an inner cylindrical portion 20 and does so in such a manner as to provide a substantial annular recess or receptacle 21 in between the two cylindrical portions 14 and 20. Extending radially inwardly from the inner cylindrical portion 20 is a radially extending anchor portion 22 to which an elastomeric sealing element 23 is molded. This may be done in any of several well-known manners, such as that of U.S. Pat. No. 3,004,298 which attaches the elastomer member 23 to the case 13 without regard to the shape of the outer portion of the case 13. As shown in FIG. 2, the elastomeric member 23 preferably has a main lip 24 and a dust excluding lid 25, and the main lip 24 is preferably urged toward the shaft by a garter spring 26 located in a suitable recess 27. Except for the shape of the case 13, the seal unit 11 is very much like a large number of standard fluid seals. Instead of the bonded structure shown, other structures may be used, or other means of securing the seal lip besides bonding may be used, so far as the present invention is concerned.

The bootlike sleeve 12 preferably has an end anchor portion 30 (See FIG. 3, especially) an axially collapsible central portion 31, and ring portion 32. Before its insertion into the annular recess 21, the anchor portion 30 may have the shape shown in FIG. 3, with an outer cylindrical wall 33, an inner cylindrical wall 34, an end wall 35 and two sloping walls 36 and 37, joining the cylindrical walls 33 and 34 to the end wall 35. The axially collapsible portion 31 is much thinner than is the end anchor portion 30. It may be provided with a frustoconical portion 38 joining it to a radial end wall portion 39 of the anchor portion 30, and the inner cylindrical wall 34 may extend axially beyond the outer cylindrical wall 33 and terminating in a short step 40. The axially collapsible portion 31 may have a generally cylindrical portion 41 provided in between its ends with a thickening bead 42, which helps to direct the flexing of the portion 42 when it collapses axially.

Beyond the bead 42 and beyond the end of this collapsible portion 31, the ring portion 32 may be connected to the axially collapsible portion 31 by a pair of frustoconical walls 43 and 44 that converge towards the cylindrical portion 41, thereby providing stiffer portions 30 and 32 at each end of the sleeve 12, with the thin, flexing, or collapsible portion 31 in between. The ring portion 32 may have an end wall 45 and a cylindrical portion 46 that is adapted to engage a shaft 47 in a light, reciprocating, and rotary contact.

As shown in FIG. 2, the entire unit 12 may be a single integral elastomeric molding, all made from the same material and therefore, homogeneous. On the other hand, as shown in FIG. 4, the ring portion 32 may have a separate ring member 47 made of either metal or plastic or other suitable rigid member, which is bonded to the elastomeric portion in a recess 48 of suitable shape and size.

The elimination from the bootlike sleeve 12 of this invention of the metal case shown in U.S. Pat. No. 2,983,125 results in considerable savings, and the case 13 of the fluid seal member 11 is somewhat less expensive itself than that shown in the patent. Yet, the operation of assembly of the present unit is less expensive and just as good. The light frictional fit of the anchor 30 in the recess 21 actually enables replacement of one part or the other without replacing both parts should that be desirable, although normally they are replaced both at the same time.

FIG. 5 shows installation of the seal embodying this invention and the rear end transmission. The housing 16 is shown with its bore 15 receiving the case portion 14 in a press fit; the cylindrical portion 14 of the seal is inserted into the bore 15 with the outer flange 17 engaging the end wall 18 to prevent over-insertion and to define accurately the position of the seal.

The shaft 47 is here a sleeve which rotates with a splined shaft 48 relative to the housing 16 and can reciprocate relative to the housing 16, the seal lip 24, and the shaft 48. A universal joint member 50 may be integral with or screwed to the sleeve 47. The dust sealing and the lubricant sealing lips 24 and 25 ride on the sleeve 47, while the ring periphery 46 barely touches the sleeve 47.

When the transmission housing 16 is moved closer to the universal joint 50, the wall 51 or the universal joint engages the ring wall 45 and pushes it toward the housing 16, as shown in FIGS. 6 and 7. Since the ring portion 32 is thicker than the flexing portion 31, the movement of the ring 32 forces the portion 31 to flex as shown in FIG. 6, a portion running out over and around the rib 42. Further movement results, as shown in FIG. 7, in the full flexing of the portion 31. The structure with the rib 42 and the flexing portions 41, and the thickening of the end portions 30 and 32 provides a regular and repetitive flexing along the same lines each time, the cylindrical portion 42 becoming slightly concave after a little use.

It will be appreciated that when the sleeve 12 is flexed, it still excludes dust, dirt, moisture, and other foreign matter from the sleeve 47, and its abutment with the wall 51 prevents access of these agents to the sleeve 47. Thus, when the rear wheels hit rough spots in the road, the movement in the drive shaft 48 and the sleeve 47 does not impair their cleanliness. As a result, the life of the sealing element 23 is considerably extended over the life of the sealing elements known to the art before U.S. Pat. No. 2,983,125.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for sealing against the passage of liquid between a housing and a rotating shaft that projects beyond the housing and is also subject to reciprocating action, comprising:
   a radial shaft seal having an annular case with an outer cylindrical portion for engaging said housing in a leak-tight fit, an inner generally cylindrical portion spaced away from said outer cylindrical portion and connected thereto by a generally radially extending portion, a radially inner anchor portion connected to said inner cylindrical portion, and an elastomeric sealing member supported by said anchor portion for a like-tight fit with said shaft, said inner and outer cylindrical portions and said generally radially extending portion defining between them an annular receptacle; and
   a separate elastomeric shaft-encircling sleeve having an annular compressible portion substantially filling said receptacle and friction-locked to said case thereby, and having an elongated axially collapsible portion extending out therefrom and having, at a point remote from said case, a ring portion in light reciprocating and rotary contact with said shaft.

2. The device of claim 1 wherein said case has an outer radial portion connected to said outer cylindrical portion and projecting radially outwardly therefrom, for engagement with an end wall of said housing.

3. The device of claim 1 wherein said ring portion includes a rigid ring member for contact with said shaft and adhered to the elastomeric sleeve.

4. The device of claim 1 wherein said sleeve consists of a single integral elastomeric member.

5. The device of claim 1 wherein said sleeve's annular compressible portion comprises a thickened end portion with inner and outer cylindrical walls, an end wall, and sloping portions connecting said end wall to said cylindrical walls, the portion of said sleeve adjacent said end portion, being substantially thinner than said end portion.

6. The device of claim 1 wherein said axially collapsible portion is substantially cylindrical, with a thickening bead on the interior surface thereof in between the extremities of said axially collapsible portion.

7. A fluid seal for engagement with a rotating shaft that is subject to some reciprocation, including in combination:
   an annular metal case having a pair of cylindrical walls providing a bore-fitting portion and an annular recess;
   an elastomeric sealing member supported by said case in rotary sealing engagement with said shaft; and
   a separate elastomeric boot member having a first end portion frictionally anchored in said annular recess, an axially collapsible sleeve portion joined to said end portion, and a second end portion having a ring in light reciprocating and rotary contact with said shaft.

8. The fluid seal of claim 7 wherein said boot member is a single homogeneous elastomeric piece.

9. The fluid seal of claim 7 wherein said ring is a separate rigid member secured to said second end portion.